United States Patent Office 2,984,193
Patented May 16, 1961

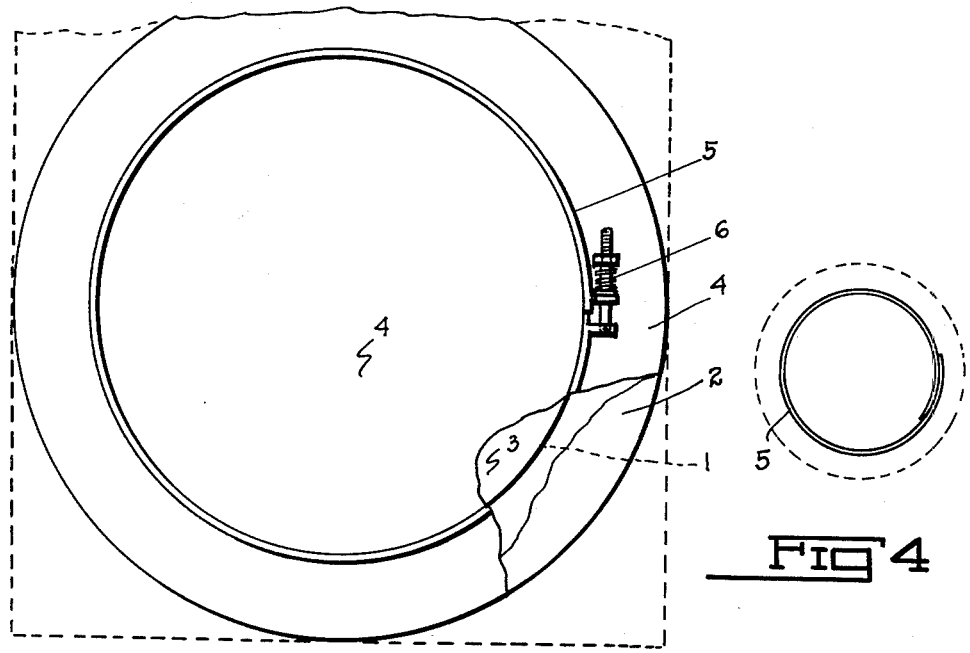
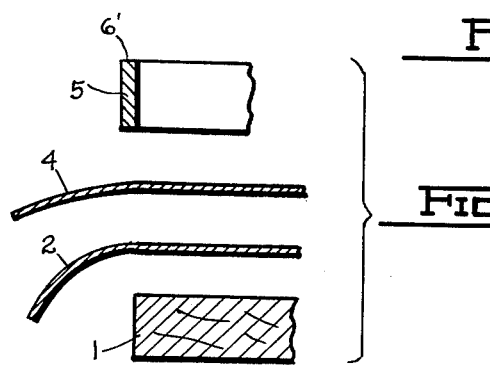
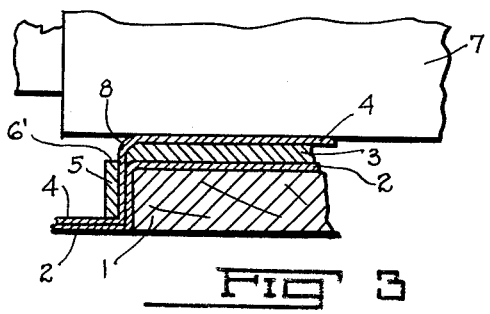

2,984,193

PIE CRUST FORMING DEVICE

Eleanor A. Rasmussen, 907 Glenshire Road, Glenview, Ill.

Filed Aug. 22, 1956, Ser. No. 605,552

1 Claim. (Cl. 107—46)

This invention relates in general to a dough rolling device and in particular to a means for rolling pie crusts to a predetermined diameter and thickness.

The conventional method of making pie crusts is to make a batch of dough and roll it with a rolling pin on any flat surface or special board powdered with flour to keep the crusts from adhering to the board and to the rolling pin. Generally, the shape and thickness of the crust depends on the individual's skill in the manipulation of the rolling pin. It is not an especially easy process to roll out good pie crusts without wasting material and time.

The prior art discloses various forms of crusts making devices of a similar nature, all with different peculiarities of construction and method of use. Insofar as I am aware none of the prior art structures employ the same arrangement as my device.

The primary object of my invention is to provide a pie crust making device employing a forming board, two sheets of flexible material receivable on the board to cover same, and a "hoop" or peripheral clamping member retaining the sheet material on the board, the dough being received between the two sheets of flexible material.

Another object of my invention is to provide a pie crust forming device in which a board is covered with one sheet of flexible material, a predetermined supply of dough is placed on the flexible sheet, a second flexible sheet is used to cover the dough, a peripheral clamping member is applied to hold both flexible sheets securely to the board, whereby the dough will be confined in the area between the flexible sheets and manipulation of a rolling pin will flatten out the dough to the desired thickness.

A further object of the invention is to provide a crust forming device in which the peripheral edge is substantially flush with or below the upper surface of the board on which the crust is being formed.

One more object of my invention is to provide a crust forming device which is very simple to use, provides for easy removal of the finished crust and transfer to a pie tin, and is capable of being cleaned in an expeditious manner, the initial cost being relatively low.

Another object of my invention is to provide a modified form of crust forming device in which the flexible sheets or covers are each provided with a peripheral bead, one bead fitting within the other, the rolling pin riding on the beads to form a crust with a thickness the same as the thickness of the beads.

Other objects and advantages as well as the construction and manner of use of my invention will be readily apparent by reference to the following specification in connection with the accompanying drawing in which:

Fig. 1 is a plan view of one form of my invention.

Fig. 2 is a fragmentary disassociated view of the various elements of my invention in the order in which they are assembled.

Fig. 3 is a fragmentary sectional assembly view of the device with a portion of a rolling pin in dough rolling position.

Fig. 4 shows a modified form of hoop or peripheral clamping member, the dotted lines indicating its form when expanded.

Fig. 5 is a fragmentary sectional view of a modified form of my invention.

Fig. 6 is a fragmentary plan view of the modified form.

Referring now to the drawing by numerals of reference, 1 designates a flat base which may be of wood, metal or any synthetic material. It is preferably circular in configuration. A flexible sheet 2 of plastic or any other suitable material is placed on the base 1 and the dough 3 is placed on the flexible sheet 2. Experience will indicate just how much dough is needed for a pie crust of a certain diameter.

With the proper supply of dough on the flexible sheet 2, another flexible sheet 4 is placed over the dough which may then be partially flattened out by hand pressure.

Sheets 2 and 4 may be square or round in configuration with equal results, it being important only that the edges of the sheets fully overlap the peripheral edge of the base 1. Certain types of plastic sheet material have been found very effective in that they are impervious to moisture, do not adhere to the dough and are easily cleaned.

A sheet clamping member 5 which may be in the form of a hoop with tensioning spring 6, or which may be an elastic band of rubber, polyethylene or the like, surrounds the base 1 and holds the two flexible sheets firmly in place as shown in Fig. 3. The top edge 6' of the clamping memebr may be flush with the top surface of the base member as shown, or it may be slightly below, it being important that the rolling pin does not ride on the clamping member.

The form of hoop or clamping member shown in Fig. 4 can be made of a firm but flexible material and may be expandible so it can be used for bases of different sizes.

A rolling pin 7 is used to flatten out the dough 3 between the two flexible sheets, the peripheral portion 8 of the upper sheet forming a restraining means for the dough when it is rolled out to the edge. Pressure of the rolling pin will always be on the dough with my device, whereas in types of dough rolling devices where an upstanding peripheral flange is used and the rolling pin rides on the peripheral flange, an even crust cannot be formed if an insufficient supply of dough is used since full pressure of the rolling pin cannot be brought to bear against the dough.

Primarily, two flexible sheets are used with the dough therebetween because dough would normally adhere to a wooden and some other type bases unless flour is used to prevent sticking. With sheets of plastic or the like, the dough will not adhere to either sheet and can be easily removed after rolling for transfer to the pie baking tin. When a base of certain synthetic resin material is used or one which has its upper surface coated with a synthetic material of nondough-adhering properties, it is possible to eliminate one of the flexible sheets of material, the rolled crust being easily removable from the base for transfer to the pie tin. However, there are some advantages to the use of the two flexible sheets in that, when the top sheet is removed, the lower sheet can be used to transfer and deposit the rolled crust to a pie tin without touching the crust with one's hands, making for a more sanitary arrangement.

In the modification shown in Figs. 5 and 6, each sheet 9 and 10 is provided with peripheral beads 11 and 12 respectively, one bead fitting diametrically within the other bead to form a closed structure in which the dough 13 can be rolled, the bead 11 providing a restraining means to hold the dough within the limits of its predetermined diameter.

From the foregoing it will be seen that I have provided a simple and effective means for forming pie crusts, eliminating a great deal of guess work as well as the skill necessary in forming the crust circular in shape. The rolling pin will not contact the dough and consequently will not need cleaning, the remaining elements being easy to wash and keep clean. The use of flour to prevent sticking of the dough will be eliminated and the crust need not be touched by the hands, making for improved sanitation.

It is obvious that changes in form, proportion and details of construction may be resorted to without departing from the spirit of my invention and I reserve all rights to such changes as come within the scope of these specifications and the claim which follows.

What I claim as new and desire to secure by Letters Patent is:

A pie crust forming device comprising a pair of flexible sheets of material, a rigid circular bead about the periphery of each of the flexible sheets, one sheet being larger in diameter than the other sheet whereby the bead on one sheet will fit within the other bead and in juxtaposition therewith, the flexible sheets being adapted to receive a supply of dough therebetween, one of said beads forming a confining member and thickness gauge for the dough as it is being rolled.

References Cited in the file of this patent

UNITED STATES PATENTS

| | | |
|---|---|---|
| 1,212,040 | Fletcher | Jan. 9, 1917 |
| 1,982,155 | Earman | Nov. 27, 1934 |
| 2,355,307 | Kors | Aug. 8, 1944 |
| 2,524,705 | Huseby | Oct. 3, 1950 |
| 2,699,738 | Brittain | Jan. 18, 1955 |
| 2,744,475 | Ayres | May 8, 1956 |